United States Patent
Bauer

[15] 3,687,575
[45] Aug. 29, 1972

[54] CONVEYOR WORM FOR CONVEYING LIQUIDS AND MUD-LIKE SUBSTANCES

[72] Inventor: Josef Bauer, Gustavsburg, Germany

[73] Assignee: Maschinenfabrik Augsburg-Nurnberg Aktiengesellschaft Zweigniederlassung Nurnberg, Nurnberg, Germany

[22] Filed: July 7, 1970

[21] Appl. No.: 52,935

[52] U.S. Cl. .................417/423, 415/122, 198/213
[51] Int. Cl. ....F04b 17/00, F04b 35/04, F01d 15/12, F03d 11/02, B65g 33/00
[58] Field of Search ........417/423; 415/122; 198/213

[56] References Cited

UNITED STATES PATENTS

| 1,914,486 | 6/1933 | Burton | 198/213 X |
| 2,812,054 | 11/1957 | Dorris et al. | 198/213 |
| 494,368 | 3/1893 | Decker | 198/213 X |
| 3,454,213 | 7/1969 | Valbjorn | 417/902 |

*Primary Examiner*—Robert M. Walker
*Attorney*—Walter Becker

[57] ABSTRACT

A worm conveyor, especially for conveying liquid and mud, with a trough partly surrounding the worm and with a drive for rotating said worm, in which one end of said worm is rotatably journalled directly on said trough, whereas the other end of the worm is drivingly connected to said drive and through the latter is indirectly supported by said trough.

9 Claims, 3 Drawing Figures

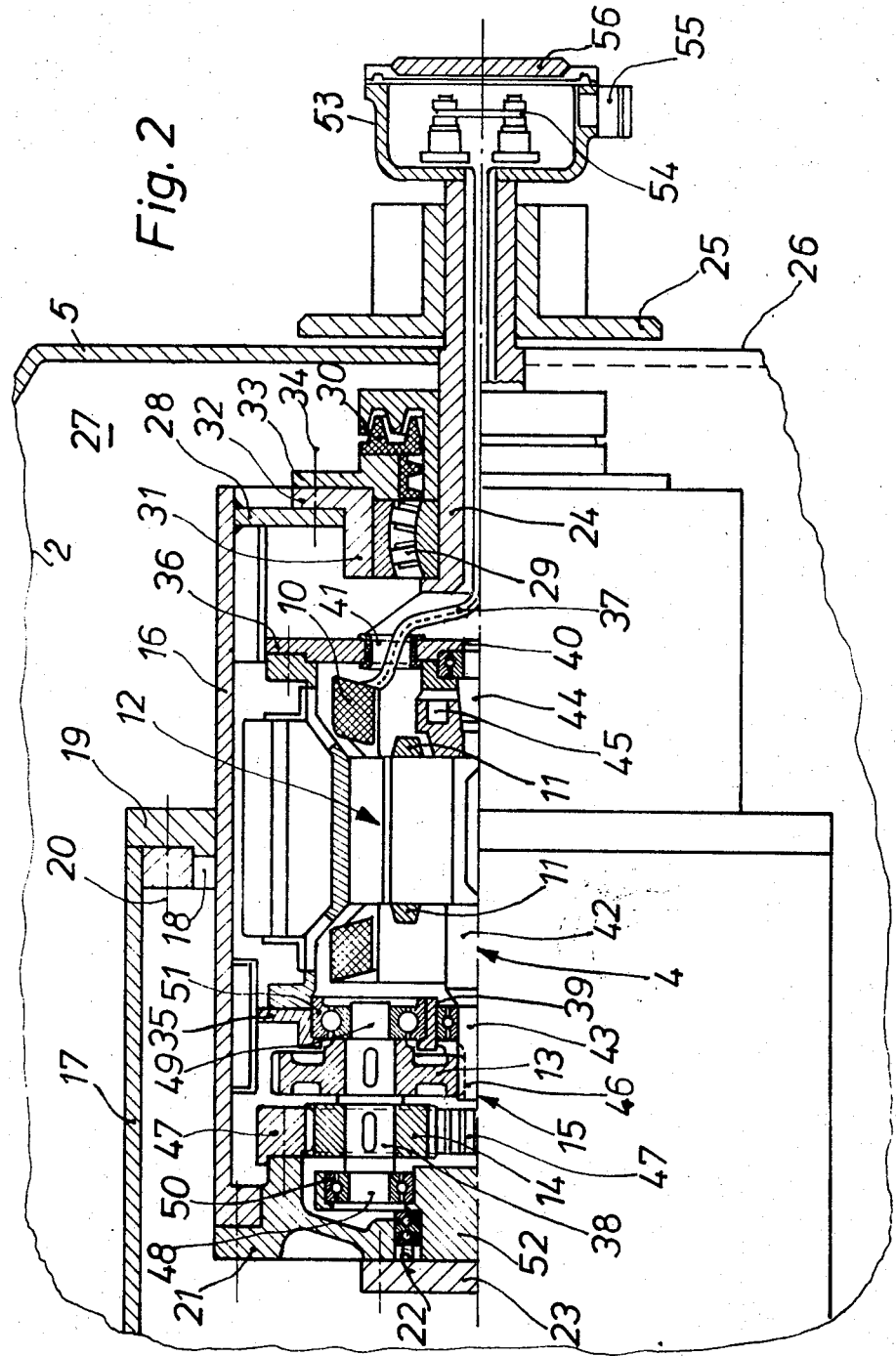

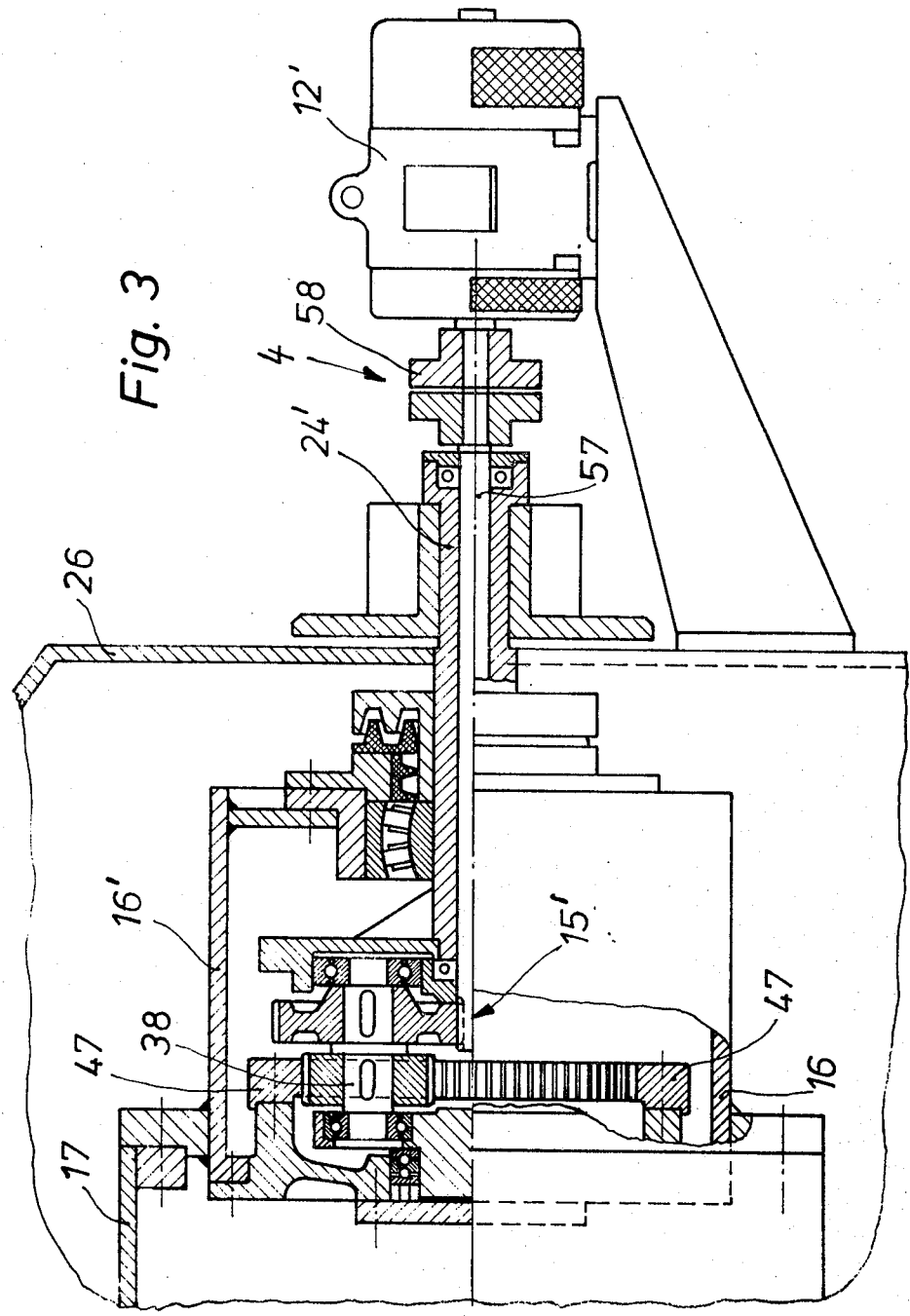

CONVEYOR WORM FOR CONVEYING LIQUIDS AND MUD-LIKE SUBSTANCES

The present invention relates to a conveyor worm for conveying liquids and mud-like substances, which comprises a trough surrounding the worm and also comprises a drive for rotating the conveyor worm.

Especially in the waste water art, it is known to introduce into the so-called sedimentation or settling tanks the waste water and from these tanks to withdraw the waste water by means of conveyor worms for purposes of further presettling or prepurifying the waste water. Depending on the further processing of the waste water, the liquids or mud-like substances are withdrawn from such sedimentation tanks. The conveyor worms employed for withdrawing the liquids or mud-like substances are, as a rule, rotatably journalled in troughs which likewise, depending on the intended purpose of employment, are stationary or are together with the conveyor worm mounted on the foundation so as to be adjustable as to height. The adjustability of the worm or trough as to height has, in contrast to stationary arrangements, the advantage that the conveyor worm will be able to operate within the optimum working range inasmuch as this worm is adapted to be immersed in the liquid or mud-like substance in conformity with the level of the liquid or mud to be conveyed. In order to be able to withdraw the liquid or mud from the tank, it is necessary to rotate the conveyor worm and it is for this reason that the conveyor worm or worms are provided with drives usually preceded by a transmission.

With a heretofore known conveyor worm of the type involved, the drive for driving the worm is mounted on a supporting frame, and this drive is through the output shaft thereof drivingly connected to the input shaft of the worm through a coupling or clutch. The supporting frame is connected to the trough of the worm trough pump and is adapted together with the tiltably journalled trough to be tilted about a joint in conformity with the desired level or height. Inasmuch as the supporting frame for the drive of the worm has to be designed relatively heavy in order to be able to support the weight of the drive without difficulties, the necessity arises, during the lifting and lowering of the conveyor worm or of the trough, also to have to lift and lower the heavy frame.

It is this fact which has given rise to the present invention and, more specifically, it is an object of the present invention to provide a conveyor worm for conveying liquids and mud-like substances which will have only a relatively low weight.

This object and other objects and advantages of the invention will appear more clearly from the following specification in connection with the accompanying drawings, in which:

FIG. 2 shows an enlarged partial section through that end of the conveyor worm according to FIG. 1 which is adjacent the drive, and also shows a compact design of the drive.

Figure 1:
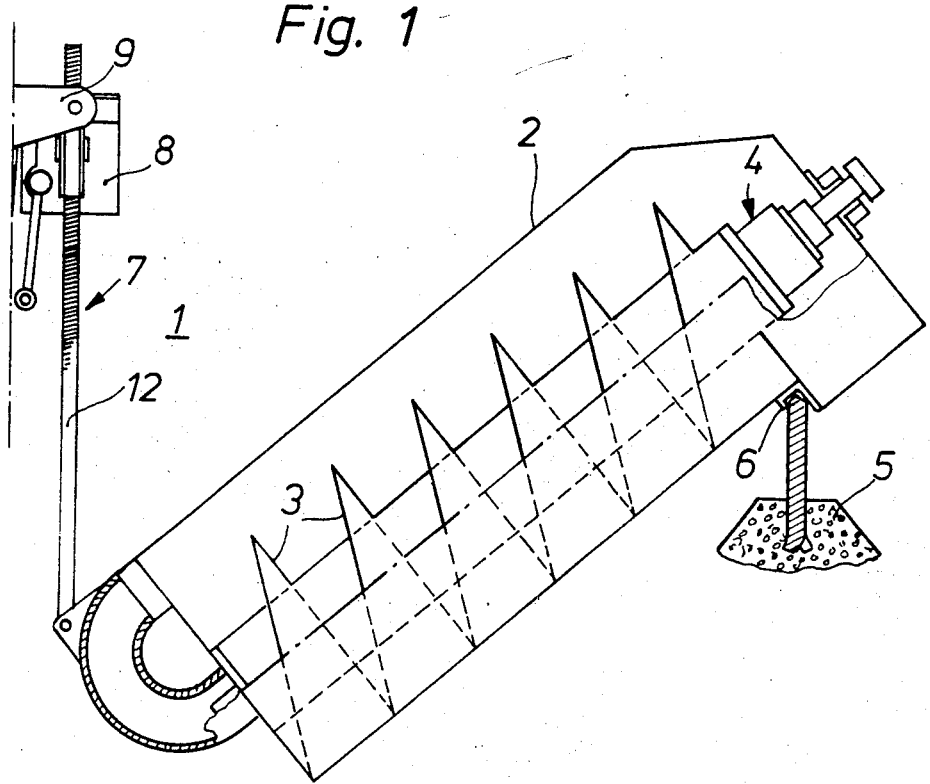
FIG. 1 illustrates a side view of the conveyor worm in conformity with the invention.

FIG. 3 likewise shows an enlarged section through a portion of the same conveyor part as FIG. 2 but with a non-compact drive design.

The conveyor worm for conveying liquids, mud-like substances, and the like according to the present invention, which is provided with a trough partially surrounding the worm and is furthermore provided with a drive for rotating the conveyor worm, is characterized primarily in that one end of the conveyor worm is directly rotatably journalled on the trough whereas the other end of the worm is connected to a drive flanged to said last mentioned end while the worm through the said end of the worm is indirectly connected to the trough.

According to a further development of the invention, and for purposes of obtaining a compact design, the drive is designed as a geared engine with a bearing bushing connected to the end of the conveyor worm and with a bearing stud for rotatably journalling said bearing bushing, said stud being non-rotatably connected to the trough.

In view of the above outlined features, the problem underlying the present invention has not only been solved in an advantageous manner but, in addition thereto, a conveyor worm has been created which is particularly simple. Due to the fact that the motor and transmission are mounted in a shaft tube, the motor and the transmission are fully protected against dust and jet water. The water passing by the shaft tube may simultaneously be employed for cooling the driving electromotor and also for cooling the transmission oil.

Due to the fact that according to a further feature of the invention, when designing the drive as a compact drive, the stationary winding of the drive motor is mounted on the bearing stud and the rotating winding is mounted on the bearing bushing, a particularly simple tap is obtained through the stud on the stationary trough for transmitting the torque.

Depending on the purpose for which the conveyor worm is to be used, i.e., whether the difference in height between the lower and the upper brine level remains the same or varies greatly, the conveyor worm may with greatly varying differences together with its trough be adjustable as to height. To this end, according to a further development of the invention, the trough is within the range of its preferably upper end rotatably journalled in a bearing in the foundation and with its other end is pivotally suspended on a spindle drive for lifting and lowering the trough or the conveyor worm. According to a further feature of the invention, the bearing at the side of the foundation may be designed as knife edge bearing.

If a compact design of the driving end of the conveyor worm is not important, according to a further feature of the invention, preferably with stationary worm trough pumps, the transmission may be provided in the bearing bushing and the drive motor may be arranged outside the trough while the transmission and the drive motor are interconnected through a shaft which is surrounded by a hollow bearing stud.

Immersed in a tank 1 serving to collect a liquid, sludge or slurry, is a conveyor worm 3 which is partly surrounded by a trough 2. The conveyor worm 3 in the embodiment illustrated in FIGS. 1, 2, and 3 is directly mounted with its lower end on the trough 2, whereas the opposite, upper end is similarly, but indirectly mounted on the trough 2, with drive means to rotate the conveyor worm 3 interposed. Furthermore the trough 2 itself is mounted with its upper end, i.e., the end adjacent to the drive 4, on a knife-edge bearing 6 secured in a partition 5 of the tank 1, while its bottom end is hinged to a screw 7, the drive 8 of which is fixed at a stationary point 9 serving to vary the angle of the conveyor worm 3 and trough 2. The drive 4 which in the embodiment illustrated in FIGS. 1 and 2 takes the form of a geared motor, consists of a motor section 12 comprising electric windings 10 and 11 and a gearing section 15 comprising gears 13 and 14. The motor section 12 and the gearing section 15 are housed in a cylindrical bushing (or rather shell) 16 which projects with a substantial length into the hollow shaft 17 of the conveyor worm 3 in which it is fixed for positive torque transmission by ring flanges 18, 19. In order to obtain a torque-transmitting joint, there is a ring flange 19 fitted to the bushing (shell) 16 and another ring flange 18 is fitted inside to the end of the shaft 17, the ring flanges 18 and 19 being solidly connected by means of a number of bolts spaced around the circumference of the flanges. The bushing (shell) 16, having its one end, which projects into the shaft 17, closed by an annular support ring 21 and an end plate 23 covering the annular opening 22 of the support ring, is supported with the end projecting from the shaft 17 on the stud (or rather trunnion) 24 of the geared motor, the stud (trunnion) being fixed by means of a flanged collar to the end wall 26 of the trough 2. Supporting the end of the cylindrical bushing (shell) projecting from the hollow shaft 17 on the stud (trunnion) 24 and sealing of this end and, thereby, the interior of the bushing (shell) 16, from the trough space 27 to prevent ingress of liquid, is by a collar 31 incorporating the bearing 29 and a seal 30 provided between an annular flange 28 attached to the inside of the bushing (shell) close to its outer end and the stud (trunnion) 24. The collar 31 is supported on the stud (trunnion) 24 and provided with circular flanges 32 and 33, directed away from the stud (trunnion), the collar being solidly connected by bolts 34 to the annular flange 28 of the bushing (shell) 16. The motor section 12, which consists of the stationary winding 10 and the rotating winding 11, is arranged inside bushing (shell) 16 in a manner that the stationary winding 10 is connected at its ends to frames 35 and 36, which are a sliding fit inside shell 16. Each frame 35 and 36 is of annular shape with the greater diameter providing a sliding support for bushing (shell) 16. In addition to the central bores 39 and 40 in which the motor is supported, the frames 35 and 36 have additional openings 41 to permit the power supply lead 37 to be brought into the stationary winding 10 and to support one end of the shaft 38 of the gearing section 15. The rotating winding 11 of the motor section 12 is mounted on a shaft 42 which has journals 43 and 44 at its ends by means of which the winding 11 is centrally supported in the frames 35 and 36. The power supply to the rotating winding 11 is by means of another lead not shown in the drawing whose wires are connected to the collector brushes 45 of the rotating winding 11. The power is transmitted to the gearing section 15 from the shaft 42 of the rotating winding 11 by means of a pinion 46 projecting into the gearing section to mesh with the first gear 13. Via gear 13 and shaft 38, the motor output is taken to the second gear 14 also mounted on shaft 38 and, thence, to an internal gear ring 47 flanged to the support ring 21. By this internal gear ring 47, which is solidly connected to the support ring 21, the power is transmitted to bushing (shell) 16 and from there to hollow shaft 17 of the conveyor worm 3. The shaft 38 of the gearing section 15 is formed with journals 48 and 49 supported in bearings 50 and 51, one being mounted in the frame 35 next to the motor section 12 and the other on a support collar 52 which is flanged to end plate 23. The bearings 50 and 51 supporting shaft 38 may be standard ball bearings. The power lead 37 to the motor section or, where separate leads are adopted to the stationary winding 10 and the rotating windings 11, the necessary power leads, are laid in a tube extending from the collar 31 to a terminal box 53. This tube, which forms the stud (trunnion) 24, extends through the end wall 26 of the trough 2 and is provided on the outside with a flange collar 25 for better support. This stationary stud (trunnion) 24 serves as a torque reaction support for the motor section 12 so that, with the winding 10 fast to the stud (trunnion), the rotating winding 11 can turn to produce useful torque. The terminal box 53 containing terminals 54 for the motor section 12 and an entry 55 for the power leads as well as a cover 56 to seal the terminal box is preferably of watertight construction and solidly attached to stud (trunnion) 24. Due to the fact that the terminal box 55 is located outside the conveyor, the power leads will in no way interfere with the raising and lowering of the conveyor 2—3. Varying the angle of inclination of the conveyor 2—3 in the tank 1 is effected by means of the drive 8 operating a screw spindle 7 which is hinged to bracket 9. The inclination of the conveyor 2—3 can be selected so that it will operate in its range of optimum lift, or with the worm 3 immersed at optimum depth. The liquid, sludge or slurry brought up out of the tank 1 can be discharged at the drive end of the conveyor 2—3 via a chute 57. Discharge can be into another tank or conveyor not shown in the drawing. This arrangement of an integral drive offers the advantage of very short length of the conveyor, because the motor section 12 and gearing section 15 are accommodated inside the hollow shaft 17 of the worm impeller 3.

Where a compact design of the drive head of the conveyor 2—3 is not important, it is possible, as shown in the embodiment illustrated in FIG. 3 to have the gearing section 15 of the drive 4 inside bushing (shell) 16' and the motor section 12' outboard mounted, i.e., outside the trough 2'. In this case, the gearing section 15' and the motor section 12' would be connected by means of a shaft 57 extending through the trepanned stud (trunnion) 24 and a coupling 58 between shaft 57 and motor section 12'. This design, which lends itself specially for fixed-angle troughs, offers another advantage in that it can be constructed at reduced costs. Apart from this, the drive head 4 is similar to the embodiment described in the foregoing, with the exception that bushing (shell) 16' is of a somewhat shorter length, because it is only the gearing section 15' that projects into the hollow shaft 17 of the conveyor worm 3.

Generally, both drive versions for the conveyor worms 3 lend themselves to fixed-angle and variable-angle trough applications.

It is, of course, to be understood that the present invention is, by no means, limited to the specific showing

What I claim is:

1. A worm conveyor, especially for conveying liquid and mud, which includes: a shaft means capable of being rotatably driven and hollow on at least one end thereof, worm means on said shaft means, trough means partially surrounding said worm means peripherally, one end of said worm means being rotatably journalled on said shaft means directly on said trough means, and driving means at least in part fitted compactly complementary into said trough means and drivingly connected to the other end of said worm means and rigidly supported by said trough means so as to thereby indirectly journal said other end of said worm means on said trough means.

2. A worm conveyor according to claim 1, in which said driving means includes geared driving means with a bearing bushing connected to said other end of said worm means and with a bearing stud for rotatably supporting said bearing bushing, said bearing stud being non-rotatably connected to said trough means.

3. A worm conveyor according to claim 2, in which said driving means includes electric motor means having stationary winding means connected to extension of said bearing stud and also having rotary winding means connected to said bearing bushing.

4. A worm conveyor according to claim 1, which includes adjusting means associated with said trough means and worm means for adjusting said trough means and said worm means as to height.

5. A worm conveyor according to claim 4, in which said adjusting means includes spindle means pivotally connected to one end of said trough means and operable selectively to lift and lower said one end of said trough means, said conveyor also including supporting means tiltably supporting the other end of said trough means and defining the pivot axis about which said trough means is tiltable by actuation of said spindle means.

6. A worm conveyor according to claim 5, in which said supporting means forms a knife-edge bearing.

7. A worm conveyor according to claim 1, which includes bearing bushing means connected to said other end of said worm means, and in which said driving means includes motor means and transmission means, said transmission means at least being located within said bearing bushing means, and said motor means being located outside said bearing bushing means and said trough means, said conveyor also including said shaft means drivingly interconnecting said motor means and said transmission means, and hollow bearing stud means surrounding said shaft means and rotatably journalling said bearing bushing means.

8. A worm conveyor according to claim 7, which includes coupling means interposed between said shaft means and said motor means.

9. A worm conveyor according to claim 7, in which said transmission means has flanged connection to said motor means and with exception of said stud means fits compactly in said bushing means.

* * * * *